United States Patent [19]

Yamaguchi et al.

[11] Patent Number: 4,675,510
[45] Date of Patent: Jun. 23, 1987

[54] COOKING APPLIANCE WITH SELF-CONTAINED WEIGHING SYSTEM

[75] Inventors: Kimiaki Yamaguchi, Ikoma; Kazumi Hirai, Nabari, both of Japan

[73] Assignee: Matsushita Electric Industrial Co., Ltd., Kadoma, Japan

[21] Appl. No.: 847,096

[22] PCT Filed: Sep. 27, 1982

[86] PCT No.: PCT/JP82/00388
§ 371 Date: May 24, 1983
§ 102(e) Date: May 24, 1983

[87] PCT Pub. No.: WO83/01289
PCT Pub. Date: Apr. 14, 1983

Related U.S. Application Data

[63] Continuation of Ser. No. 503,199, May 24, 1983, abandoned.

[30] Foreign Application Priority Data

Oct. 5, 1981 [JP] Japan .............................. 56-158543

[51] Int. Cl.[4] ............................................ H05B 6/68
[52] U.S. Cl. .............................. 219/518; 219/10.55 B;
219/10.55 C; 177/164; 177/245; 99/325
[58] Field of Search .................. 219/10.55 B, 10.55 R,
219/10.55 D, 10.55 C, 518; 177/229, 211, 245,
143, 144, 126, 165, 164; 99/325

[56] References Cited

U.S. PATENT DOCUMENTS

| 3,259,056 | 7/1966 | King . | |
|---|---|---|---|
| 3,522,855 | 8/1970 | Waseman . | |
| 4,392,535 | 7/1983 | Fujii et al. | 177/165 X |
| 4,425,490 | 1/1984 | Takeda et al. | 219/10.55 B |

FOREIGN PATENT DOCUMENTS

| 2450024 | 9/1980 | France . |
|---|---|---|
| 57-155034 | 9/1982 | Japan . |
| 58-184432 | 10/1983 | Japan . |
| 58-221333 | 12/1983 | Japan . |

*Primary Examiner*—Philip H. Leung
*Attorney, Agent, or Firm*—Wenderoth, Lind & Ponack

[57] ABSTRACT

An arrangement comprises a hinge (4) positioned in the lowest region of the front surface at a front opening (2) in a heating chamber (1), a door (3) swingable around the axis of the hinge (4), and a weight detecting section (11) provided on the hinge (4) of the door (3) for detecting the weight of a heating load (20) by converting deformation produced by the load into an electric signal, wherein the weight of the heating load (20) placed on the door (3) when the latter is opened is detected by the weight detecting section (11). Accurate weight detection is possible no matter where the heating load (20) may be placed on the door (3). Tare subtraction weight detection is possible by utilizing a microcomputer. Further, it is also possible to automatically control heating operation in association with weight detection.

3 Claims, 10 Drawing Figures

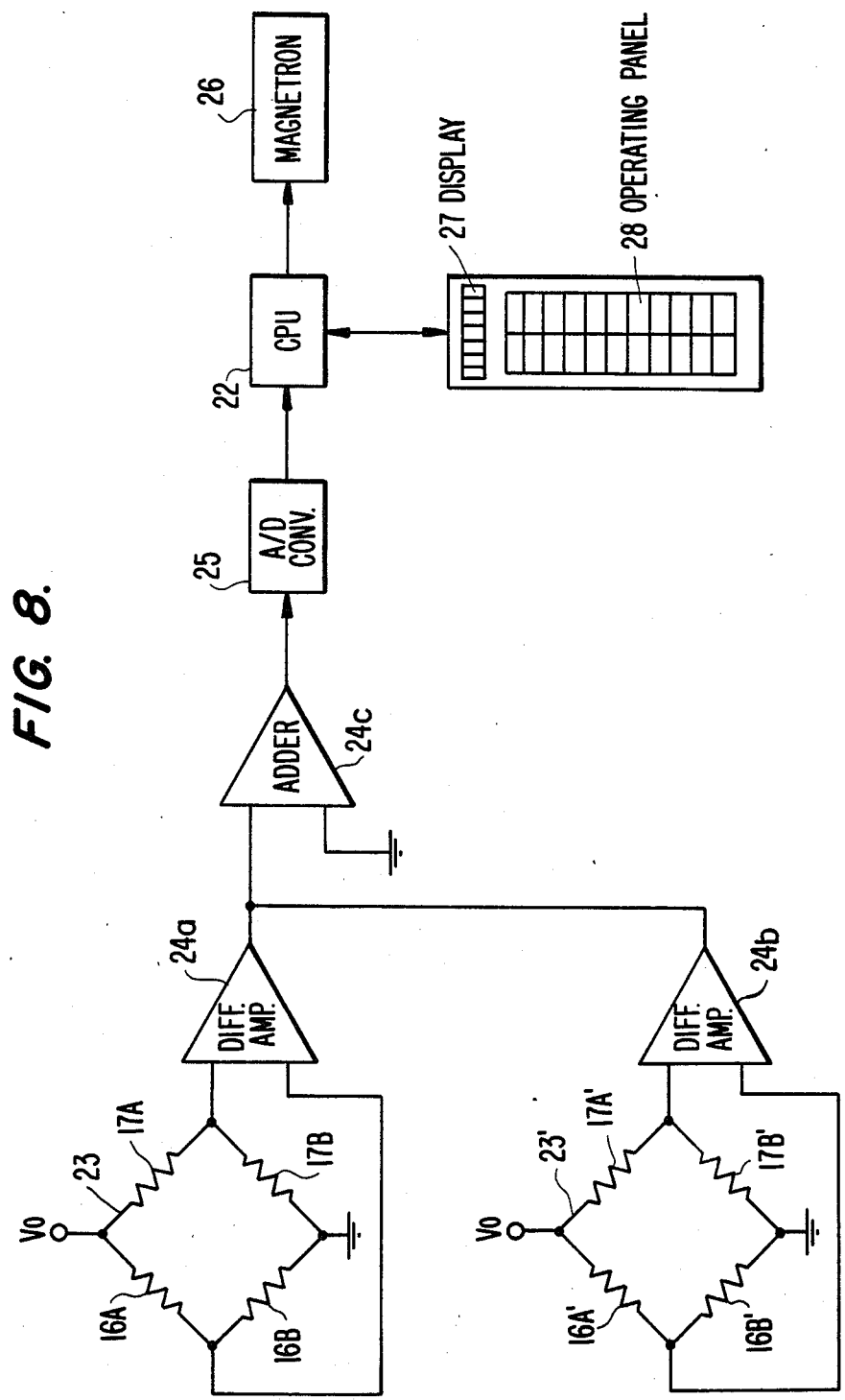

COOKING APPLIANCE WITH SELF-CONTAINED WEIGHING SYSTEM

This application is a continuation, of now abandoned application Ser. No. 503,199, filed May 24, 1983.

BACKGROUND OF THE INVENTION

1. Field of the Invention

The present invention relates to a cooking appliance, such as a microwave oven or electric oven, having the function of weighing heating loads.

2. Description of the Prior Art

In a conventional microwave oven, for example, when food, which is a heating load, is heated by microwaves, most of the high frequency energy is absorbed by the food, unlike the case of using a conventional heat source. Thus, since the time needed for heating greatly increases with the weight of food, it is very difficult to set the optimum cooking time and particularly where defrosting is intended, if the food is heated for a longer time than the optimum time, this can result in raw meat being boiled.

From such viewpoint, there have been proposed many microwave ovens equipped with weighing means and a microwave output control operatively connected to said means.

In reality, however, such weighing function-equipped microwave ovens have not been put into practical use.

A first reason is a problem about the position of the load receiving pan for carrying food thereon. That is, measurements of the weight of food require a sufficient space around the load receiving pan to allow the food to be placed thereon.

From this viewpoint it may be contemplated, as the simplest construction, to install a load receiving pan on the upper surface of the microwave oven body and install a measuring device within the body for detecting the weight of food in operative association with the movement of the load receiving pan. When the general conditions for use of cooking appliances such as microwave ovens are considered, however, it will be seen that the upper surface of the body would be utilized to place things thereon or would be close to the ceiling or hanger shelves or located at too high a place to reach it; thus, this is inconvenient for use.

Another idea would be to provide a construction wherein the turntable in the heating chamber of the microwave oven body is concurrently used as a load receiving pan while installing a weighing device operatively connected to the turntable. However, such a construction will encounter technical difficulties and involve high costs. Even if this construction is somehow obtained, it is necessary to subtract the weight of a container, wrapper, etc. for food, that is, to allow for the tare, thus requiring additional operation of first weighing the container and then putting the food therein and reweighing the same. This construction, dictating such additional operation to be performed in the narrow heating chamber, cannot be said to be convenient for use.

SUMMARY OF THE INVENTION

The present invention is intended to eliminate the problems described above.

The invention provides a convenient, good-looking, technically improved and inexpensive cooking appliance equipped with a weighing means comprising a weight detecting section which supports part or all of the weight of a door turnable around hinges located in the lower region of the front surface at the front opening of the heating chamber, the arrangement being such that the weight of a heating load placed on the door when the latter is opened is detected by said weight detecting section.

BRIEF DESCRIPTION OF THE DRAWINGS

FIG. 8 is a block diagram of the weight detection control circuit of said oven.

DESCRIPTION OF THE PREFERRED EMBODIMENTS

(First Embodiment)

Figure 1:
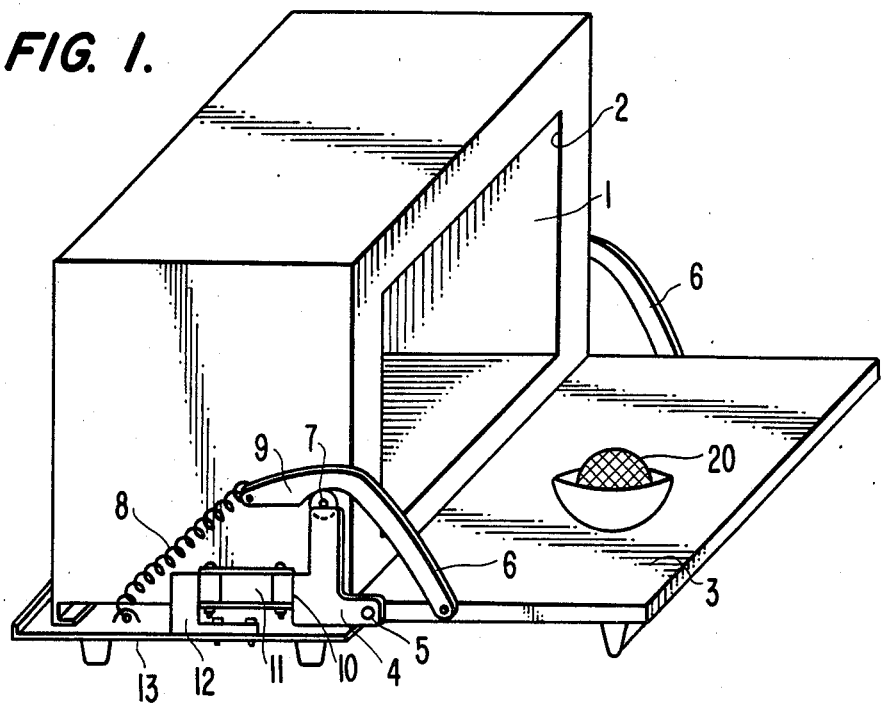
FIG. 1 is a perspective view of a microwave oven according to an embodiment of the invention, with the outer case removed.
Figure 2:
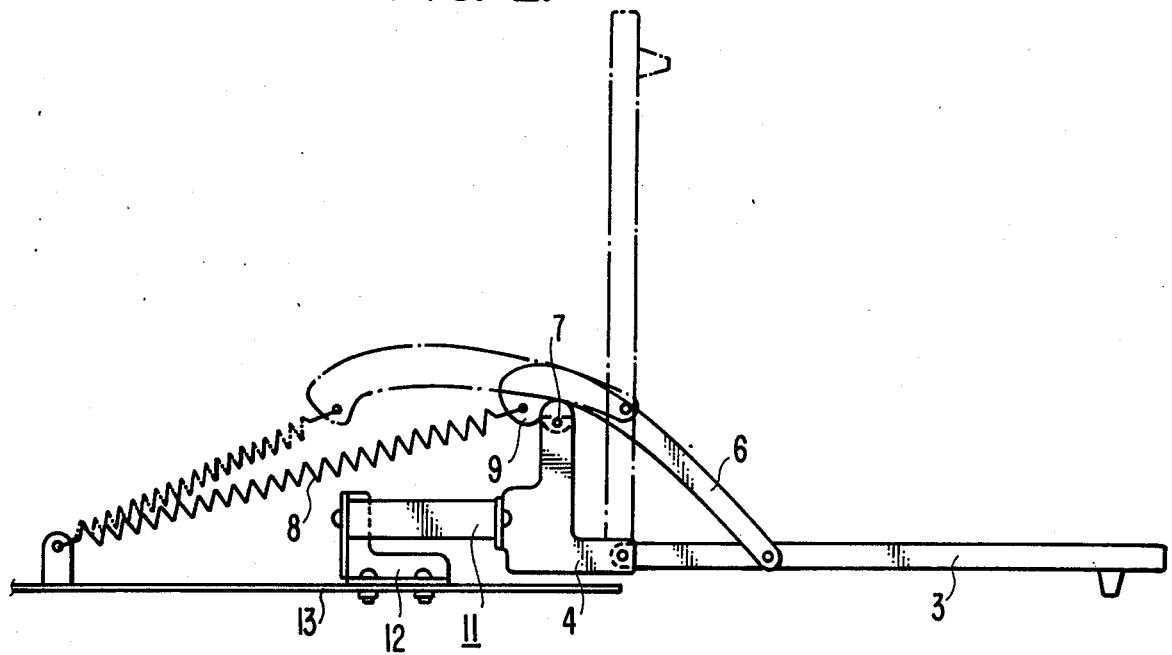
FIG. 2 is an enlarged side view of a weight detecting section in said microwave oven.

In FIGS. 1 and 2, a door 3 installed at the front opening 2 of the heating chamber 1 of a microwave oven is turnable around the axis of a pivot 5 for a hinge 4 located in the lower region of the front surface. A door arm 6 for the door 3 is guided by a guide roller 7 rotatably installed on the hinge 4 and is constantly urged in the closing direction of the door 3 by a spring 8.

When the door 3 is opened and assumes a substantially horizontal position, the stop portion 9 of the door arm 6 abuts against the guide roller 7 to prevent further opening of the door 3. One end 10 of the hinge 4 is connected to a weight detecting section 11 provided with a strain detector, said weight detecting section 11 being installed on a fixture 12. The latter is bolted to the bottom plate 13 of the body. In addition, the above-described arrangement is also applied to the other side not visible in these figures.

The principal portion of the arrangement will now be described with reference to FIG. 3.

Figure 3:
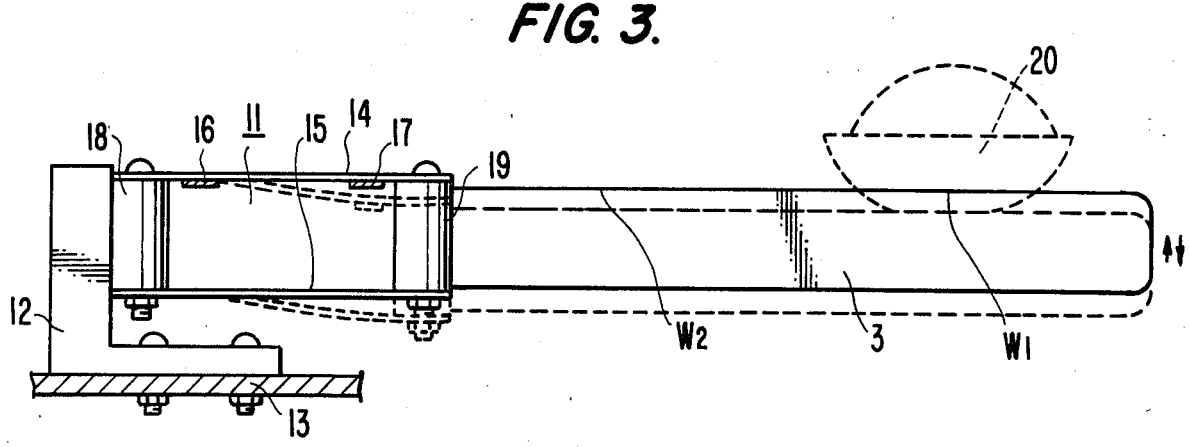
FIG. 3 is a layout view of the door of said oven.

In FIG. 3, some parts including the hinges 4 and door arms 6 are omitted for clarity.

The weight detecting section 11 has two plate springs 14 and 15 incorporated therein to constitute a parallelogram mechanism based on the known Roberval principle, one of said plate springs 14 and 15 being provided with strain gages 16 and 17, which are weight detecting elements. More particularly, spacers 18 and 19 in the form of rigid blocks and said plate springs 14 and 15 form a parallelogram which functions as a Roberval mechanism, said plate spring 14 having strain gages 16 and 17 intimately applied thereto whose electric resistances change in proportion to strains in said plate spring 14. The spacer 18 is fixed to the bottom plate 13 of the body through the fixture 12, while the other spacer 19 is joined to the door 3 through the hinge 4, as shown in FIG. 1 (in FIG. 3, the hinge 4 being omitted).

Figure 4:
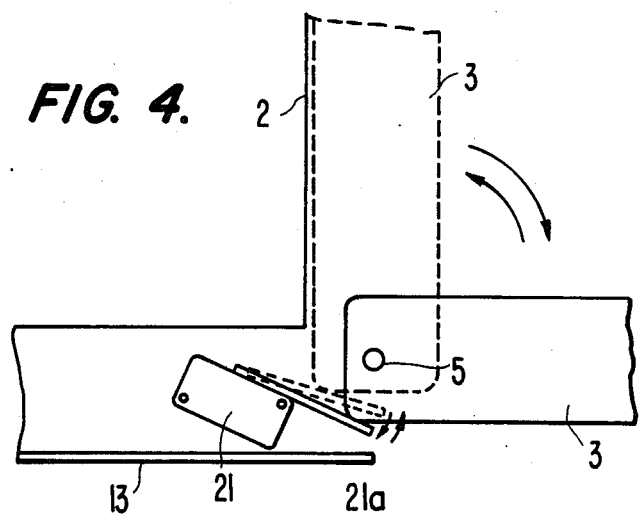
FIG. 4 is a view to be used with an explanation of the operation of a detecting section for detecting the closed state of the door.
Figure 5:
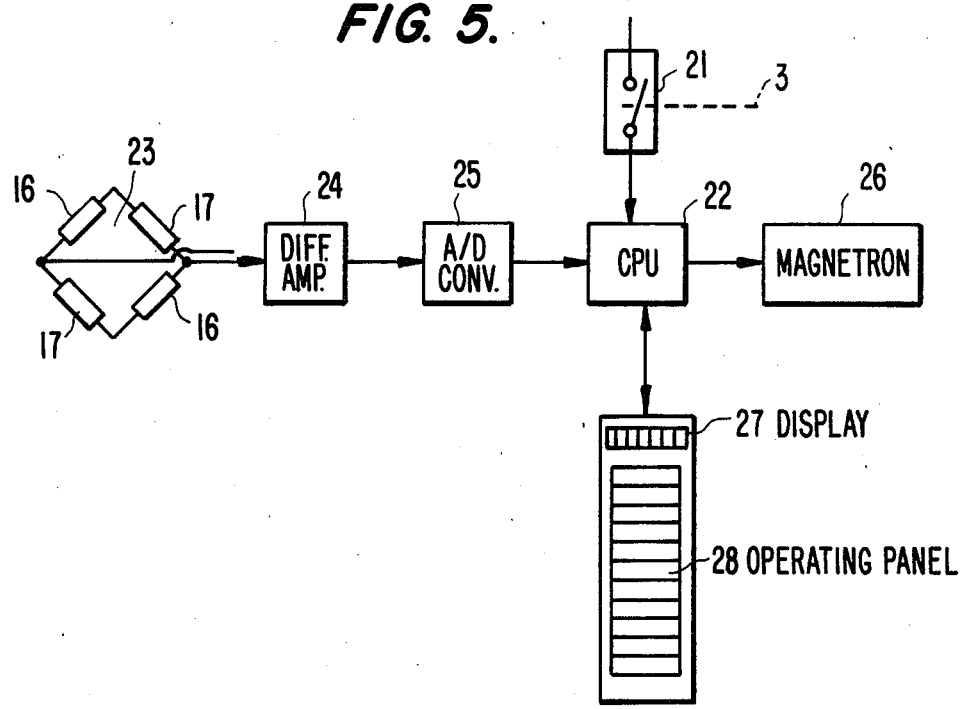
FIG. 5 is a block diagram of a control circuit.

FIG. 4 shows a detecting section for detecting the opening and closing of the door 3. The numeral 20 in FIGS. 1 and 3 denotes food, which is a heating load. As for the detector for detecting the opening and closing of the door 3, a microswitch 21, for example, may be contemplated. When the door 3 is moved from the closed position shown in broken lines to the open position shown in solid lines, the lever 21a of the microswitch 21 is depressed to turn on or off the microswitch 21, whereupon a corresponding electric signal is transferred to a CPU 22 (microcomputer) in the control device, as shown in FIG. 5.

The functions and effects of the above arrangement will now be described.

The door 3 is opened substantially horizontal. At this time, the plate springs 14 and 15 of the weight detecting section 11 support the total weight of the door 3 including the door arms 6 and hinges 4 and also bear the pulling forces of the door springs 8 determined by the position of the door 3.

At this time, since the microswitch 21 detects the opening of the door 3, the CPU 22 stores the output from the thus loaded weight detecting section as an initial value. When food 20 to be cooked is placed on the back of the door 3, the plate springs 14 and 15 flex by the amount corresponding to the weight of the food, with the result that the amount of flexure is detected as the difference from the initial value of electric resistance of the strain gages 16 and 17. What is important in this case is the fact that since the output from the weight detecting section 11 is stored in the CPU 22 as an initial value in response to a signal from the microswitch 21 when the door 3 is opened, the weight of the food 20 is calculated by the CPU 22 as the difference between the output from the weight detecting section 11 delivered upon placement of the food 20 and the initial value previously stored.

Furthermore, the action of the Roberval mechanism ensures that the plate springs are flexed the same amount whether the position at which the food 20 is placed is at W1 close to the front end of the door 3 or at W2 close to the hinge 4, as shown. Thus, irrespective of the position at which the food 20 is placed, the strain gages 16 and 17 produce the same amount of change in their resistance and hence there is no error in the detected weight of the food 20.

In order that the detected value may not differ according to the right and left positions for placement of the food 20, the right and left hinges 4 in this embodiment are each provided with the weight detecting section 11 of exactly the same arrangement and the sum of the outputs from the pair of strain gages 16 and the pair of strain gages 17 is used as the detected output. That is, in this embodiment, no matter where the food 20 may be placed on the door 3, the weight of the food 20 can be accurately detected.

The outline of the control circuit will now be described with reference to the block diagram in FIG. 5.

In FIG. 5, when the door 3 is opened, the microswitch 21, which is the detector, detects the opening of the door 3 and the output from a bridge 23 is amplified by a differential amplifier 24, converted into a digital value by an A/D converter 25 and inputted into the CPU 22 composed of a microcomputer, where it is stored as an initial value for the null weight. The bridge 23 is composed of the strain gages 16 and 17, which will exhibit resistance values corresponding to loads on the weight detecting section 11, so that the bridge 23 produces outputs corresponding to such resistance values.

When the food 20 is placed on the opened door 3, the electric resistances of the strain gages 16 and 17 will change because of its weight. The output voltage from the bridge 23 corresponding to the changed electric resistances is amplified by the differential amplifier 24 and then converted into a digital value by the A/D converter 25 and inputted into the CPU 22 composed of a microcomputer. The difference between the measured value stored upon placement of the food 20 and the initial value stored when the door 3 is opened corresponds to the weight of the food 20. Thus, the CPU 22 converts this value into weight, allowing a cooking sequence and a cooking time corresponding to this weight to be set, and controlling the oscillation of a magnetron 26 while causing a display tube 27 to display the weight, cooking time or operating conditions.

According to the embodiment described above, the pair of weight detecting sections 11 are provided on the right and left hinges 4 of the door 3 and the sum of the strains in the pair of strain gages 16 and 17 is detected to weigh the food 20, so that no matter where it may be placed on the door 3, the error in weight caused by the position of placement can be minimized. Further, since each time a weight measurement is made, the initial value is set anew in response to a signal from the microswitch 21 adapted to detect the opening of the door 3, even if the null points of the bridge 23 and differential amplifier 24 change with time and temperature, accurate weighing can be attained and accurate cooking times will be displayed. Since cooking proceeds with such time schedule, failure in cooking rarely occurs. Furthermore, since the door 3 is used as a load receiving pan, the area of placement available is large and the height is moderate, providing convenience for use.

Though not mentioned in the above, in the weight detecting device for the cooking appliance according to the invention, it is, of course, possible to provide it with a tare subtracting function as in common electronic scales, by installing a tare subtracting key (reset key) on an operating panel 28, the arrangement being such that when it is pressed, the load placed on the door 3, i.e., the value including the tare is set as an initial value in the CPU 22, while when food to be weighed is placed thereon, only the weight of the food placed after the tare subtracting key has been pressed is judged to be the weight of the food by the CPU 22.

In the above embodiment, the right and left hinges 4 are each provided with a weight detecting section 11, but as another embodiment only one of them may be provided with a weight detecting section 11. In this case, however, there is a disadvantage that accurate weighing cannot be attained unless a load is placed at a predetermined position on the door 3. But from the standpoint of structural simplicity, it may be said to be superior to the above embodiment.

As described above, according to the present embodiment, the placement of food 20 on the door 3 leads the automatic detection and display of the weight of the food 20 and the cooking time or pattern, followed by the performance of the necessary operations, thus enabling automatic cooking. Furthermore, a wide space is available for placing the food 20, such space being provided by the surface of the door 3, through which the food 20 is put in and out; thus, in the case of the so-called tare subtraction weighing in which the weight of the container is subtracted, for example, the food may be once placed on the surface of the door 3 and then put in the heating chamber 1, which means that the appliance is very handy. Accurate weighing is ensured since the null point is set anew for each weight measurement.

(Second Embodiment)

A second embodiment of the weight detecting section 11 for detecting the weight of food 20 including the weight of the door 3 and hinges 4 will now be described with reference to FIGS. 6 through 8.

Figure 6:
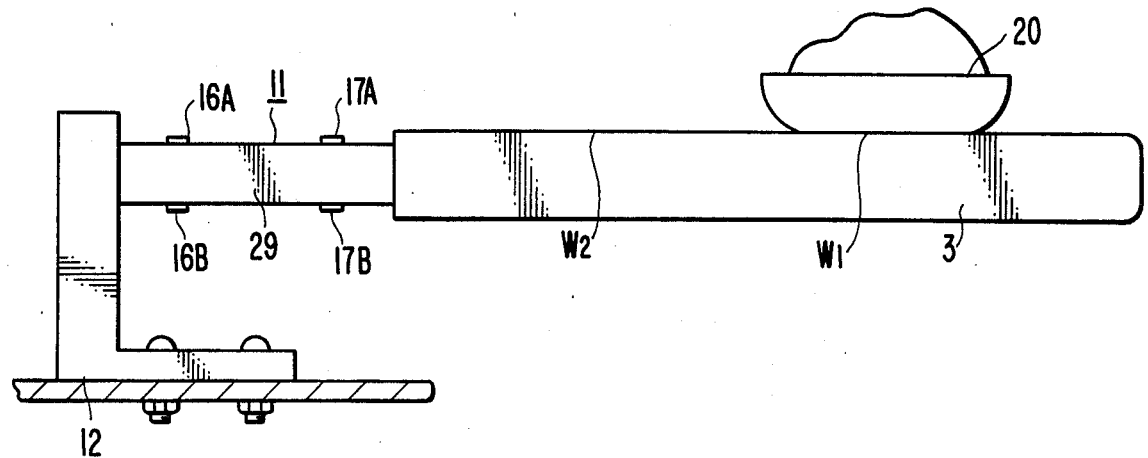
FIG. 6 is a layout view of a door weight detecting section for microwave oven according to another embodiment of the invention.

FIG. 6 serves to explain the arrangement of the principal portion where this weight detecting section 11 is used, with the hinge 4, door arm 6 and other parts being omitted as in FIG. 3.

This weight detecting section 11 comprises a single strain bar 29 and strain gages 16A, 17A, 16B, 17B for detecting strains in the strain bar 29 which depend on weight. The strain bar 29 is fixed at its one end as a fixed end to part of the body and connected at its other end as a load end to the door 3 through a hinge 4 (in FIG. 6, the hinge 4 being omitted).

Figure 7A:
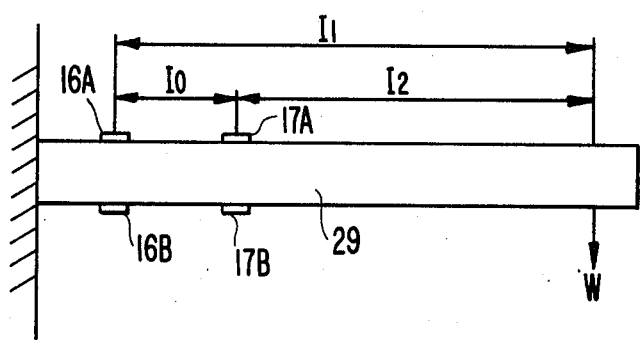
FIGS. 7 (a), (b), and (c) are views to be used with the operation of said weight detecting section.
Figure 7B:
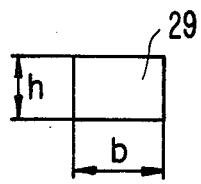
Figure 7C:
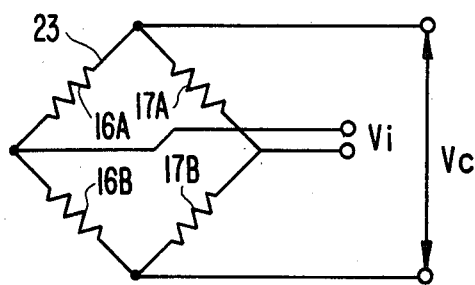

FIGS. 7(a)-(c) are principle diagrams to be used with an explanation of the principle of the weight detecting operation in this embodiment including said weight detecting section 11, wherein (a) and (b) show the construction and (c) shows an electric circuit employed. The circuit shown in FIG. 7 (c) is called a bridge circuit, the output voltage Vo of the bridge being expressed by the following equation.

$$Vc = (\Delta R1 - \Delta R2) \times Vi/(2R) \quad (1)$$

where $\Delta R1$, $\Delta R2 << R$; $\Delta R1$, $\Delta R2$ are changes in the resistances of strain gages 16A, 16B and 17A, 17B; R is the specific resistance of the strain gages 16A-17B; and Vi is the applied voltage on the bridge 23. Let F1 be the gage factor for the strain gages and $\epsilon$ be the amount of strain. Then, from the equation for strain gages in common use, $$\Delta R = \epsilon \cdot F \cdot R \quad (2)$$

Substituting $\epsilon_1$ and $\epsilon_2$ representing the amounts of strain in the strain gages at their two places of application, $\Delta R1$ representing the change in the resistance of the strain gages 16A and 16B, the $\Delta R2$ representing the change in the resistance of the strain gages 17A and 17B, in Equation (2) gives $$\Delta R1 = \epsilon_1 \cdot F \cdot R \quad (3)$$

$$\Delta R2 = \epsilon_2 \cdot F \cdot R \quad (4)$$

Substituting Equations (3) and (4) in Equation (1) gives $$Vo = F(\epsilon_1 - \epsilon_2) \times Vi/2 \quad (5)$$

Now, the amount of strain $\epsilon_1$ in the strain gages 16A-16B and the amount of strain $\epsilon_2$ in the strain gages 17A-17B will be found. When the strain bar 29 has a configuration as shown in FIG. 7 (a), the amounts of strain $\epsilon_1$ and $\epsilon_2$ in the individual strain gages can be found as follows.

$$\epsilon_1 = 6Wl_1/(E \cdot b \cdot h^2) \quad (6)$$

$$\epsilon_2 = 6Wl_2/(E \cdot b \cdot h^2) \quad (7)$$

(where E is the Young's modulus for the strain bar 29). Substituting Equations (6) and (7) in Equation (5) gives $$Vo = (3FW/E \cdot b \cdot h^2)l_0 \cdot Vi \quad (8)$$

In Equation (8), $l_0$ indicates the spacing between the places of application of the strain gages, it being shown that the place of application of load and the distance between the places of application of the strain gages have nothing to do with the output voltage of the bridge 23.

This indicates that the weight indicating section 11 based on FIG. 6 also enables the same function as that based on FIG. 3 to be attained.

The outline of the electric circuit for detection and control will now be described with reference to the block diagram of FIG. 8. Of the pair of right and left weight detecting sections 11, the one which is on the side not shown in FIG. 1 will be distinguished from the other by priming the reference numerals for the parts on that side: e.g. the weight detecting section 11', strain bar 29', and strain gages 16A', 16B', 17A', 17B'.

In FIG. 8, the weight of the food placed on the door 3 causes changes in the output voltages from the bridge 23 composed of the strain gages 16A, 16B, 17A, 17B and the bridge 23; composed of the strain gages 16A', 16B', 17A', 17B' in the pair of weight detecting sections 11 and 11', and after being amplified by differential amplifiers 24a and 24b, they are fed to an adder 24c. The output voltage from the adder 24c is converted to a digital value by an A/D converter 25 and inputted into a CPU 22 composed of a microcomputer. Thus, the arrangement and effects are the same as those of the first embodiment.

In the above embodiment, a single weight detecting section 11 is composed of two pairs of (or 4) strain gages 16A, 17A, 16B, 17B, but the same characteristics can be obtained even if it is composed of a pair of (or 2) strain gages 16A, 17A or 16B, 17B, though the output voltage is half. Furthermore, single pairs of strain gages respectively from the two right and left weight detecting sections 11, 11', or 4 strain gages, may be combined to form a bridge so that the sum of the outputs from the two weight detecting sections 11, 11' will be derived.

Reversely, to provide an increased detection output voltage, a plurality of identical strain gages may be applied to the same place so as to increase sensitivity.

As described above, according to the cooking appliance of this invention, the door 3 swingable around the axes of hinges positioned in the lower region of the front surface at the front opening in the heating chamber 1 is utilized to provide an electronic weighing function with the surface of the door serving as a load receiving pan when the door is opened. Thus, automation becomes possible in which a control device for indicating the detection output in terms of weight or controlling the optimum cooking time and temperature and the output is controlled by the weight of food detected.

We claim:

1. A cooking appliance comprising: a heating chamber adapted to accommodate a heating load; a door associated with said heating chamber so as to open and close said chamber; a heat source for heating said heating load in said heating chamber; a weight detecting means adapted to detect the weight of said heating load; a computation and control circuit means for computing the weight value of said heating load from an electrical output signal which varies in accordance with the weight of said heating load from said weight detecting means and for controlling the operation of said heat source; a switching means operable in response to an opening or closing of said door; wherein said computation and control circuit means is electrically connected to said switching means and wherein said switching means resets the measured weight value to a value corresponding to no load in accordance with an electrical signal generated in response to an opening or closing of said door.

2. A cooking appliance according to claim 1, wherein said measured weight value is reset to a value corresponding to no load by an electrical signal generated in response to an opening of said door.

3. A cooking apliance according to claim 1, wherein said computation and control circuit means is provided with a resettable memory circuit means and a calculation circuit means for comparing a measured weight value which has been previously stored in said memory circuit means with a newly measured weight value and for calculating the difference between the two values.

* * * * *